United States Patent [19]

Knothe et al.

[11] 4,219,422
[45] Aug. 26, 1980

[54] APPARATUS FOR MASS TRANSFER BETWEEN FLUIDS, PROVIDED WITH AN INTERPOSED SELECTIVELY PERMEABLE DIAPHRAGM UNIT

[75] Inventors: Erich Knothe, Bovenden; Gerhard Lorenz, Krebeck, both of Fed. Rep. of Germany

[73] Assignee: Sartorius GmbH, Goettingen, Fed. Rep. of Germany

[21] Appl. No.: 6,384

[22] Filed: Jan. 25, 1979

[30] Foreign Application Priority Data

Jan. 26, 1978 [DE] Fed. Rep. of Germany ....... 2803344

[51] Int. Cl.² .............................................. B01D 31/00
[52] U.S. Cl. .................................... 210/137; 210/181; 210/321 R; 210/321 B; 210/487; 210/493 M; 422/48
[58] Field of Search ............ 210/321 A, 321 B, 321 R, 210/493 M, 493 B, 416 M, 487, 22, 23 R, 23 F, 23 H, 175, 181, 137; 422/48; 128/DIG. 3; 55/16, 158

[56] References Cited

U.S. PATENT DOCUMENTS

| | | |
|---|---|---|
| 2,891,900 | 6/1959 | Kollsman .......................... 210/321 A |
| 3,212,498 | 10/1965 | McKirdy et al. ................. 210/321 B |
| 3,528,550 | 9/1970 | Cappelen, Jr. ......................... 210/180 |
| 3,567,028 | 3/1971 | Nose ...................................... 210/232 |
| 3,695,444 | 10/1972 | Iaconelli .......................... 210/321 A |
| 3,734,851 | 5/1973 | Matsumura ....................... 210/321 B |
| 3,864,265 | 2/1975 | Markley ............................ 210/321 B |
| 3,879,293 | 4/1975 | Wolf, Jr. et al. ................. 210/321 B |
| 3,880,759 | 4/1975 | Van Assendelft .................... 210/194 |
| 4,013,564 | 3/1977 | Nose ...................................... 210/434 |
| 4,054,527 | 10/1977 | Esmond ........................... 210/321 B |

Primary Examiner—Thomas G. Wyse
Assistant Examiner—David R. Sadowski
Attorney, Agent, or Firm—Otto John Munz

[57] ABSTRACT

Apparatus for mass transfer between fluids, comprises two permeable membranes with a porous membrane support sandwiched therebetween, all pleated together with an accordian pleat to form a pleat package, and sealed in a casing to define three flow channels from one end of the casing to the other, to form a filter having a large filter area in a minimum amount of space for use as a dialyzer or as an ultrafilter in the treatment of blood. By selection of different membrane materials, the apparatus may also be used for oxygenation of blood, and three different fluids, including both gases and liquids, may be treated.

20 Claims, 13 Drawing Figures

APPARATUS FOR MASS TRANSFER BETWEEN FLUIDS, PROVIDED WITH AN INTERPOSED SELECTIVELY PERMEABLE DIAPHRAGM UNIT

BACKGROUND OF THE INVENTION

The present invention relates to an apparatus for mass transfer between fluids, provided with a permeable diaphragm unit and a porous diaphragm support which supports the diaphragm unit, the diaphragm unit and diaphragm support being pleated to form a pleat package with parallel pleats, which in connection with a boxlike casing with inlets and outlets, form flow chambers for the fluids.

DESCRIPTION OF THE PRIOR ART

The following references are made of record:
U.S. Pat. No. 4,116,841, 09-26-1978, A. S. Borsanyi;
U.S. Pat. No. 4,028,252, 06-07-1977, L. B. Morris;
U.S. Pat. No. 3,965,012, 06-22-1976, T. Eguchi et al;
U.S. Pat. No. 3,825,493, 07-23-1974, C. E. Brown et al;
U.S. Pat. No. 3,815,743, 06-11-1974, D. Snyder.

For the carrying out of dialysis or ultrafiltration of liquid or gaseous media, a multiplicity of filtration and diffusion elements of a great variety of structures are already known, particularly where such filtration and diffusion elements are employed in "artificial kidney" machines. In these devices, a great variety of types of diffusion elements have been developed, e.g., in the form of plate dialyzers, hose dialyzers, and so-called pleat dialyzers.

The present invention, for instance, is based on a pleat dialyzer as described in the German Offenlegungsschrift No. 2,252,341 (corresponding to U.S. Pat. No. 3,788,482) and German Offenlegungsschrift No. 2,608,758 (corresponding to U.S. Pat. No. 4,028,252). In the first patent a diaphragm is pleated, so that on each side open pockets are formed into which at one side of the diaphragm support sections of a plastic material network are inserted, and in the second patent a likewise pleated network is inserted into one side of the pleat openings or pleat grooves. The compressed pleat package in each instance forms in connection with a boxlike casing two flow chambers through which the liquid, in the present case blood and dialysate, can flow via two separate chambers, so that on the basis of concentration gradients or pressure gradients a mass exchange between blood and dialysate can take place.

The pleat dialyzers described above are well suited for industrial manufacture since they originate from endless material, namely the diaphragm and the network, by parallel pleating, and thus relatively small devices, i.e., filter elements, can be produced.

Such filter elements, also called modules, should accommodate the smallest possible blood volume, and furthermore should provide an even blood distribution over the diaphragm. Additionally, such devices should present a small flow resistance on the blood side, and present a strong dialyzing effect, obtain a good filtration rate, and have a compact structure and low cost of production. The latter requirement is particularly important since these modules after having been used a single time are discarded for reasons of safety.

The known structures initially described need improvement in that the blood distribution into the pleat depth is too uneven, the cost of manufacture too high, and the diaphragm arrangement and casing structure too much adapted to specific uses.

SUMMARY OF THE INVENTION

The apparatus of the present invention for mass transfer between fluids, comprises a selectively permeable diaphragm interposed between the two fluids, and is particularly suitable for use as a filter in an artificial kidney so as to operate as a dialyzer, or as an ultrafilter, or for transfer of oxygen in the treatment of blood. Two diaphragm foils or membranes are laminated with a porous diaphragm support and pleated to form a pleat package, with the surfaces of the diaphragm membranes of adjacent pleats positioned closely adjacent and generally parallel to each other to form a pleated filter package. The filter package is enclosed in a boxlike casing with at least five connections for fluid flow. The pleat grooves of the parallel pleats form in connection with the enveloping casing walls first and second flow chambers sealed relative to each other, and each flow chamber is provided with inlet and outlet fluid connections. The diaphragm support enclosed between the two diaphragm membranes forms a hose-like third flow chamber with inlet and outlet fluid connections, and is sealed off against the first and second flow chambers. Thus, two diaphragms of the same type material, as well as two diaphragms of dissimilar materials can be used in one and the same filter casing in order to simultaneously carry out mass transfers on the basis of different transportation mechanisms, e.g., dialysis and ultrafiltration. The fluid flows in the first and second fluid chambers can be connected separately, in parallel, or in series.

The purpose of the invention is therefore the further development of an apparatus of the type initially described by simple means in such a manner that in addition to a simplified manufacture, a larger diaphragm surface for the fluids is available and the conveyance of the fluids can be better adapted to changing needs.

This purpose is achieved according to the invention by a device wherein two diaphragms or diaphragm membranes with inclusion of the diaphragm support are jointly pleated to a pleat package, in such a way that the pleats form three parallel and separate flow chambers, in which structure two chambers are formed by the pleat grooves opening toward the respective adjacent casing walls, and the third chamber is formed by the diaphragm support enclosed by the diaphragms.

With this structure it is possible to treat three different fluids, namely gases or liquids, or both combined, with one and the same apparatus, the variation possibilities being increased by the employment of various diaphragms. In this manner it is possible to use with one and the same casing, corresponding to the needs, this module as a dialyzer and/or ultrafiltration apparatus, or also as an oxygenator.

The first and second flow chambers formed by the pleat grooves on the opposite sides of the pleat package serve, when the module is used for the treatment of blood, for blood conveyance, while the diaphragm support enclosed by the two diaphragms serves as the third flow chamber for the conveyance of the dialysate and/or filtrate. The two flow chambers that convey blood may be connected separately so that two blood compartments are present. For patients of low body weight, e.g. children, it is possible to supply first at a small filling volume one half of the module with blood, and later the other half. By means of distribution bridges, the flow chambers conveying blood, i.e., the flow paths assigned to the pleat grooves, can also be connected in parallel or in series. In addition to the economic and technical advantages of a universally employable casing for various filtration inserts, the treating physician has at his disposal all possibilities in the treatment of blood, controllable by means of the module selected, whereby the treatment may be suited to the individual patient and in the best way possible.

DESCRIPTION OF THE PREFERRED EMBODIMENTS

Figure 1:
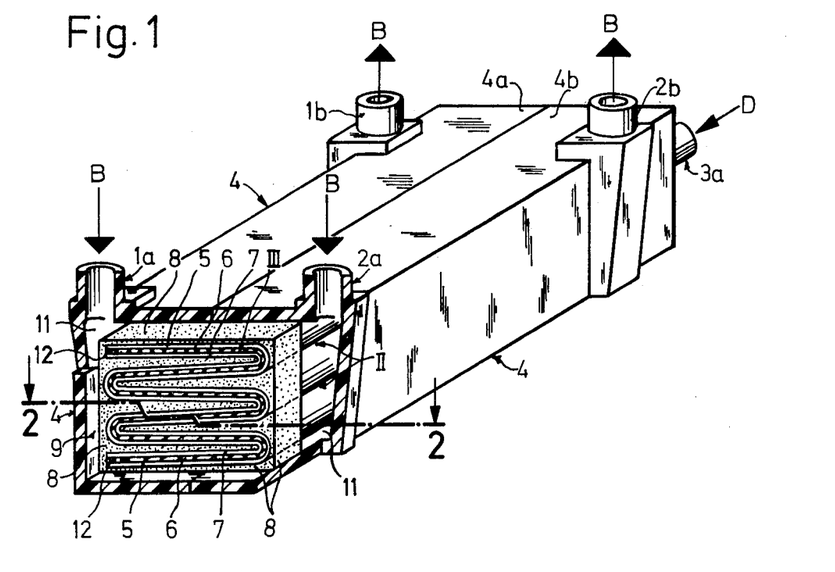
FIG. 1 is a front perspective view, with the filter being shown in section along line 1—1 of FIG. 2, the casing front side being removed.
Figure 2:
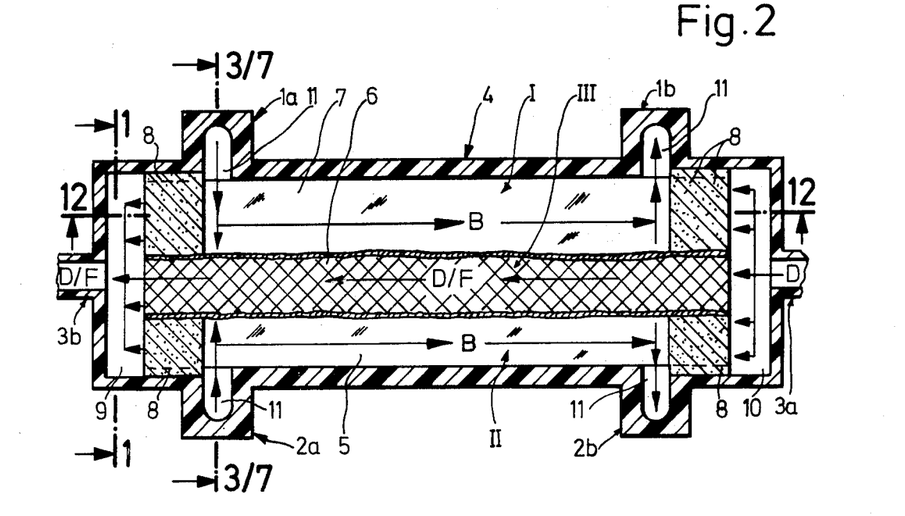
FIG. 2 is a horizontal section through the filter along line 2—2 in FIG. 1.
Figures 3, 4, 5:
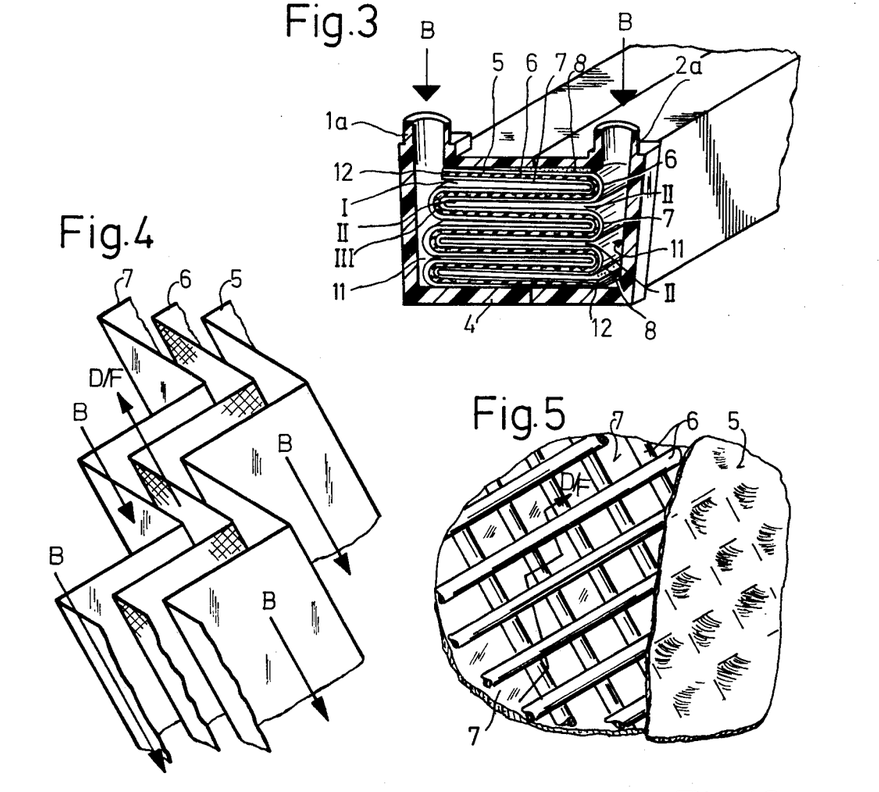
FIG. 3 is a perspective section through the casing and the pleat package behind the front-side seal, along line 3—3 in FIG. 2.
FIG. 4 is a perspective view of the pleating and the flow conveyance on the diaphragms and the diaphragm support.
FIG. 5 is an enlarged, fragmentary plan view upon the diaphragms and the enclosed support.

According to FIG. 1, the filter comprises a boxlike casing 4 which is provided on its top side with a first inlet 1a and a first outlet 1b for the block B, and on the opposite or bottom side with a second inlet 2a and a second outlet 2b for the blood B, as well as on the front side with an inlet 3a for the dialysate D and an outlet 3b for the dialysate and/or filtrate D/F. As shown in FIGS. 1, 2, and 3, inlets 1a and 2a and outlets 1b and 2b for the blood form in casing 4 downward directed distribution channels 11. In boxlike casing 4, the separating device proper is mounted in the form of a pleat package consisting of the two diaphragms or diaphragm membranes 5 and 7, and diaphragm support 6 of mesh. The pleat package is formed by positioning or laminating the diaphragm 5, diaphragm support 6, and diaphragm 7 one upon the other, and they are jointly pleated after fixation of the endless webs at the edges, as seen in FIG. 4. The laminated pleated layers are then compressed to a pleat package adapted to the height of the casing. The terminal areas of the pleated layers are pasted at the front sides or ends of the pleat grooves with a synthetic resin plastic 8, so that only the front side of the hose-like flow path, or third flow chamber, of diaphragm support 6 remains open (see FIGS. 1 and 2).

The pasting or seal 8, as seen in FIG. 2, abuts or seals on all sides of the terminal area of the pleat package with sealing effect against the casing 4 and thus seals off distribution chambers 9 and 10 for the dialysate from the rest of casing 4. Additionally, the two longitudinal edges of the terminal pleats 12 are over their whole length likewise provided with a packing paste or seal 8 (see FIGS. 6 and 8) so that the pleat package is open at both front sides only in the area of the middle layer, that is to say of the porous diaphragm support 6.

The diaphragm support 6 comprises a non-woven or interwoven network of unifilar plastic material threads, which have proved efficient for this purpose. The two diaphragms or diaphragm membranes 5 and 7 in connection with diaphragm support 6 form the hose-like flow path or flow chamber III extending in a longitudinal direction of the casing, open in the area of distribution chambers 9 and 10.

The other two flow chambers I and II are formed by the sealed relationship between the longitudinal edges of the pleat package and the longitudinal walls of casing 4 in the area between the inlets and outlets 1a and 2a, and 1b and 2b, respectively, and between the top and bottom sides of the pleat package, and the casing bottom and casing top or ceiling. The blood introduced into inlets 1a and 2a passes via distribution channels 11 into the area of the individual pleat grooves on opposite sides of the pleat package, which are open toward the respective longitudinal casing walls, and is forced, as shown in FIG. 2 and FIGS. 6 and 7, to penetrate to the pleat depth and to flow in the direction of the respective outlets 1b and 2b.

In the present embodiment, the blood introduced into inlet 1a thus flows through flow chamber I and leaves the latter through outlet 1b, while in the same manner, the blood introduced into the second inlet 2a leaves flow chamber II through outlet 2b. Preferably, in the counter-current process the dialysate flows through flow chamber III from inlet 3a, and by way of distribution chamber 10, through casing 4 in the direction of distribution chamber 9, being discharged therefrom through outlet 3b.

On the basis of the concentration drop between blood and dialysate the substances normally to be eliminated with the urine which must be extracted from the blood diffuse through diaphragms 5 and 7 into the hollow space supported by network 6, and are drained therefrom. When a vacuum pump is connected with outlet 3b for the dialysate, and the flow is throttled through inlet 3a for the dialysate by means of a hose clip or cut off entirely, an ultrafiltration from the blood side to the dialysate side takes place on the basis of a pressure drop. In this manner, larger quantities of blood water can be temporarily extracted from the blood.

Figure 6:
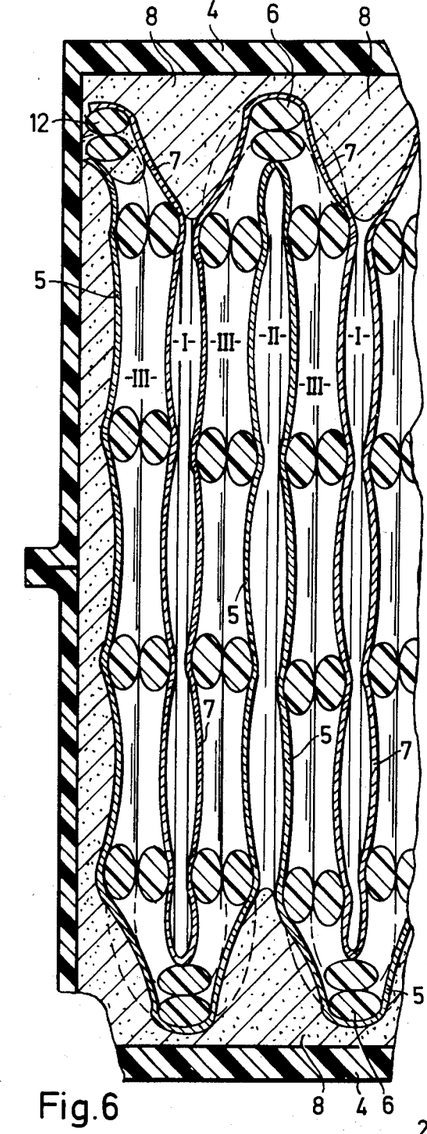
FIG. 6 is an enlarged, fragmentary section through several layers of the pleat package, illustrating the deformation of the diaphragm under the influence of the conveyed fluid, and is taken along line 6—6 in FIG. 8.
Figure 7:
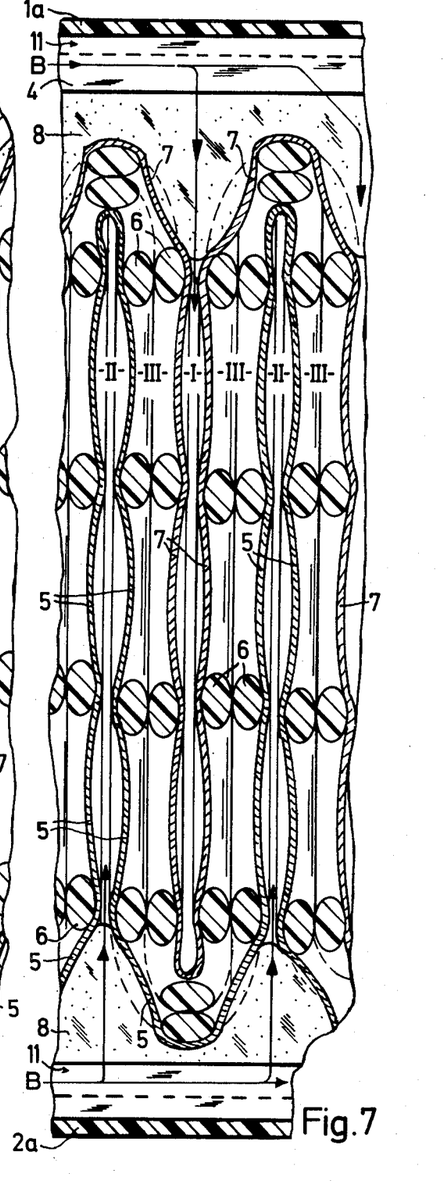
FIG. 7 is a view similar to FIG. 6, taken in the area of the inlet channels along line 7—7 in FIG. 2.

In FIGS. 6 and 7, the three flow chambers I, II and III are shown in section on an enlarged scale. In these figures, the kind of action exerted by the network or diaphragm support 6 upon the diaphragms 5 and 7 is also recognizable. Under the liquid pressure of the blood in the two chambers I and II, the two diaphragms 5 and 7 are pressed into the multiplicity of free spaces of the network 6, so that the blood can flow through the filter in a multiplicity of small narrow gaps and channels, and thereby an exchange of substances to be normally eliminated with the urine can take place from the flow chambers I and II to the flow chamber III.

As FIG. 2 shows, it is practical to convey the blood of flow chamber I in the same direction as the blood in flow chamber II through the filter. It is, however, also possible to convey the blood of flow chamber I in a counter current direction to the blood of flow chamber II. On the basis of the three separate flow chambers, it is also possible to make, depending on needs, the liquids or gases flow in direct current and/or counter current relationship through the respective flow chambers in casing 4. Thus, three different liquids and/or gases can be conveyed through flow chambers I, II and III, in order to carry out through diaphragms 5 and 7 the required mass transfer.

It is also possible to convey oxygen instead of dialysate through flow chamber III, so that the blood in flow chambers I and II is enriched with oxygen, and therefore the apparatus operates as an oxygenator. Likewise, it is possible to convey instead of the blood in one chamber, a salt solution, medicine solution, or the like, in order to accomplish very specific mass transfers or fluid treatments.

In the embodiment shown in FIGS. 1 to 5, the two diaphragms 5 and 7 are intended to perform the same kind of dialysis, and are thus both made of like material, e.g., of regenerated cellulose hydrate, known under the trademark Cuprophan (polyacrylnitrate). Depending on the type of liquid and the purpose of use, and depending on the kind of mass transfer to be carried out, other commercial diaphragms of the same type or in combination with diaphragms of other characteristics, e.g., diaphragms made of cellulose triacetate or cellulose hydrate may be employed. The diaphragms are mostly assymmetrical in cross section, of high permeability and particularly well suited for ultra-filtration.

A combination of two different diaphragms is indicated in FIGS. 6 and 7, and the filtration effects resulting therefrom can be learned from the above explanations.

The filter shown in FIG. 8 relates to a practical and successfully tested embodiment, and corresponds generally in its basic structure to the embodiment already described in connection with FIGS. 1 to 5. The same structural elements are marked with the same reference numerals.

Casing 4 comprises two identical half shells 4a and 4b, having the two distribution channels 11 and a fluid connection 3a or 3b in the area of the front side of the casing, so that only one shape is necessary.

Figures 8, 9, 10, 11:
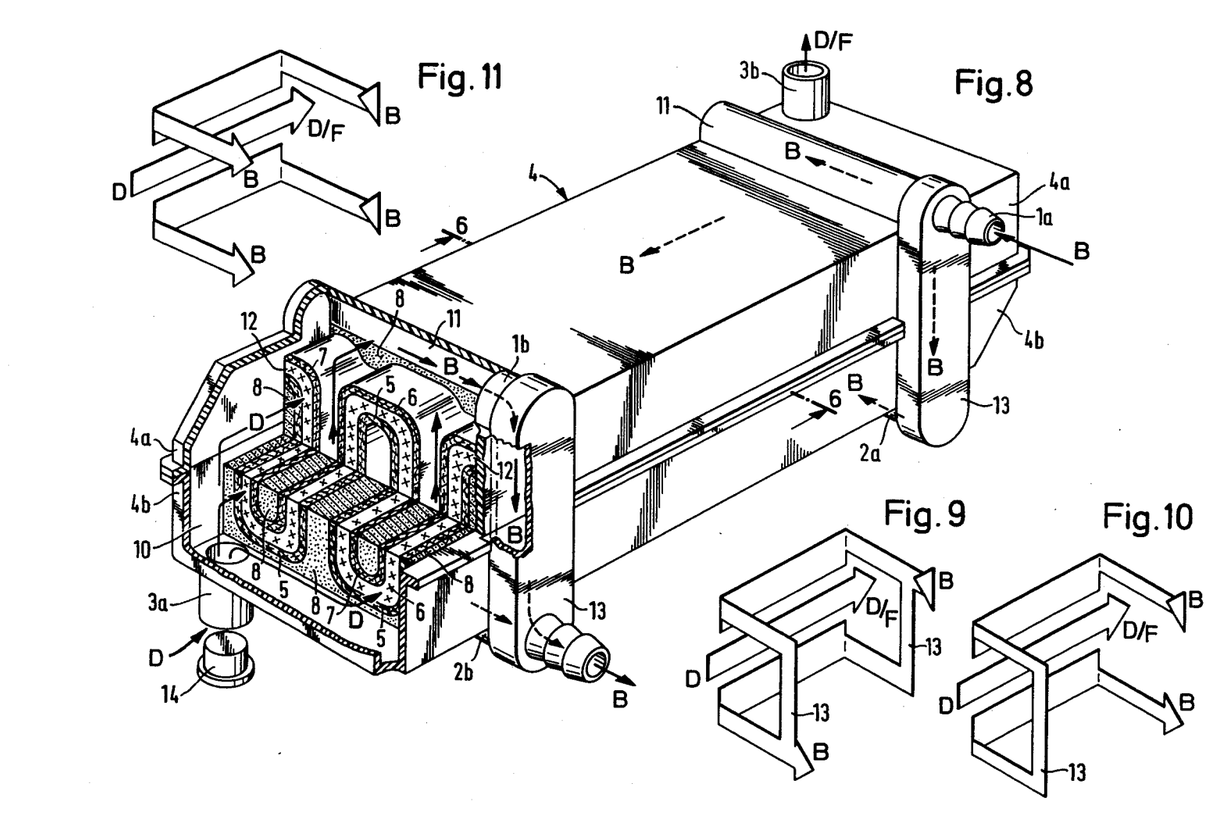
FIG. 8 is a perspective view, with the casing wall front side and filter front-side removed, showing a practical embodiment of the filter.
FIG. 9 is a diagrammatic view of the parallel connection of the blood flows.
FIG. 10 is a diagrammatic view of the connection of the blood flows in series.
FIG. 11 is a diagrammatic view of the connection of the blood flows separately.

Distribution channels 11 can, as shown in FIGS. 8 and 9, be connected by two distribution bridges 13 slid upon casing 4, and flow chambers I and II for the blood can be connected in parallel. In this structure, a hose connection nipple is mounted upon each distribution bridge, which nipples form inlet 1a and outlet 2b.

According to FIG. 10, the two blood-carrying flow chambers I and II can be connected in series by means of a suitable distribution bridge 13.

FIG. 11 shows a further arrangement for the separate conveyance of blood in the two flow chambers I and II, which permits a use thereof separately and at different time intervals, with small blood filling volume, e.g., in the dialysis of the blood of children suffering from kidney diseases.

As shown in FIG. 8, the fluid connections 3a or 3b can be selectively and when necessary closed by means of a plug 14 in order to carry out a separate ultrafiltration of the blood for extracting blood water.

The pleat package is embedded or sealed in casing 4 for the formation of the three flow chambers, by use of a commercially available toxicologically unobjectionable casting resin or adhesive 8, as is shown more distinctly in FIGS. 6 and 7.

The channel height in a pleat groove depends on the compression of the pleat package and on the structure and the opening width of network 6, and also on the number of pleats in casing 4.

The filter of FIG. 8 has a casing dimension without connections of $225 \times 54 \times 60$ mm, 45 pleats in the pleat package, an effective diaphragm surface area of 1.3 m$^2$, a blood channel height of about 40 $\mu$m, a blood filling volume of less than 60 ml, a rest blood volume less than 1 ml, a diaphragm made of Cuprophan PM 230, and an ultra-filtration rate of 4 ml/h mm Hg.

Figure 12:
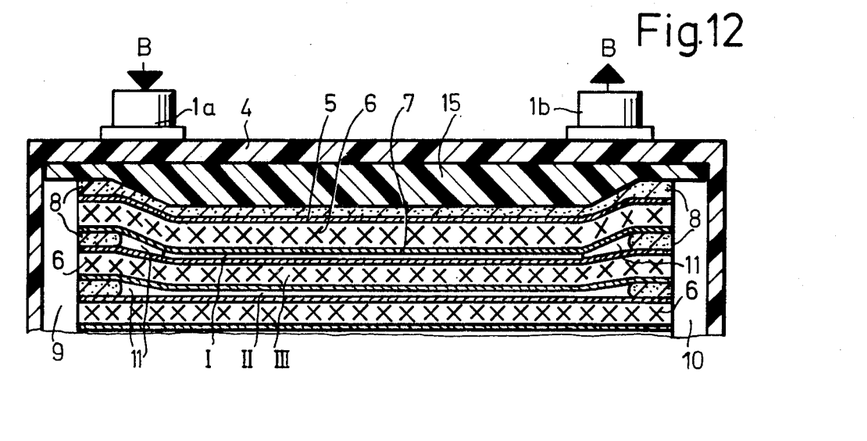
FIG. 12 is a section along line 12—12 in FIG. 2, showing a further modification.

In the diagrammatically simplified partial section of FIG. 12, a pressure plate 15 is inserted between the top diaphragm surface and the top of casing 4 on the one hand, and between the bottom diaphragm surface and bottom of casing 4 on the other hand. This pressure plate presses the pleat package in the area between distribution channels 11 to a rated size, so that the surfaces of diaphragms 5 and 7 extend parallel to one another, and whereby a defined channel height in the pleat grooves is obtained. When the force of adhesive 8 is chosen in such a way as to be somewhat greater at the front sides for sealing the pleat grooves against distribution chambers 9 and 10 than the desired channel height in the pleat grooves, the resulting channel heights in the area of distribution channels 11 are somewhat greater. The result is that the fluid, e.g., blood, conveyed therein, can penetrate better to the full depth of the pleats.

The advantage of the embodiments of the invention described herein is principally that with the aid of a standard casing a multiplicity of variation possibilities in the field of mass transfer between fluids with an interposed diaphragm unit are possible; and on the basis of the three layer pleat material, relatively large exchange surfaces for the conveyed fluids are obtained with small casing dimensions.

Figure 13:
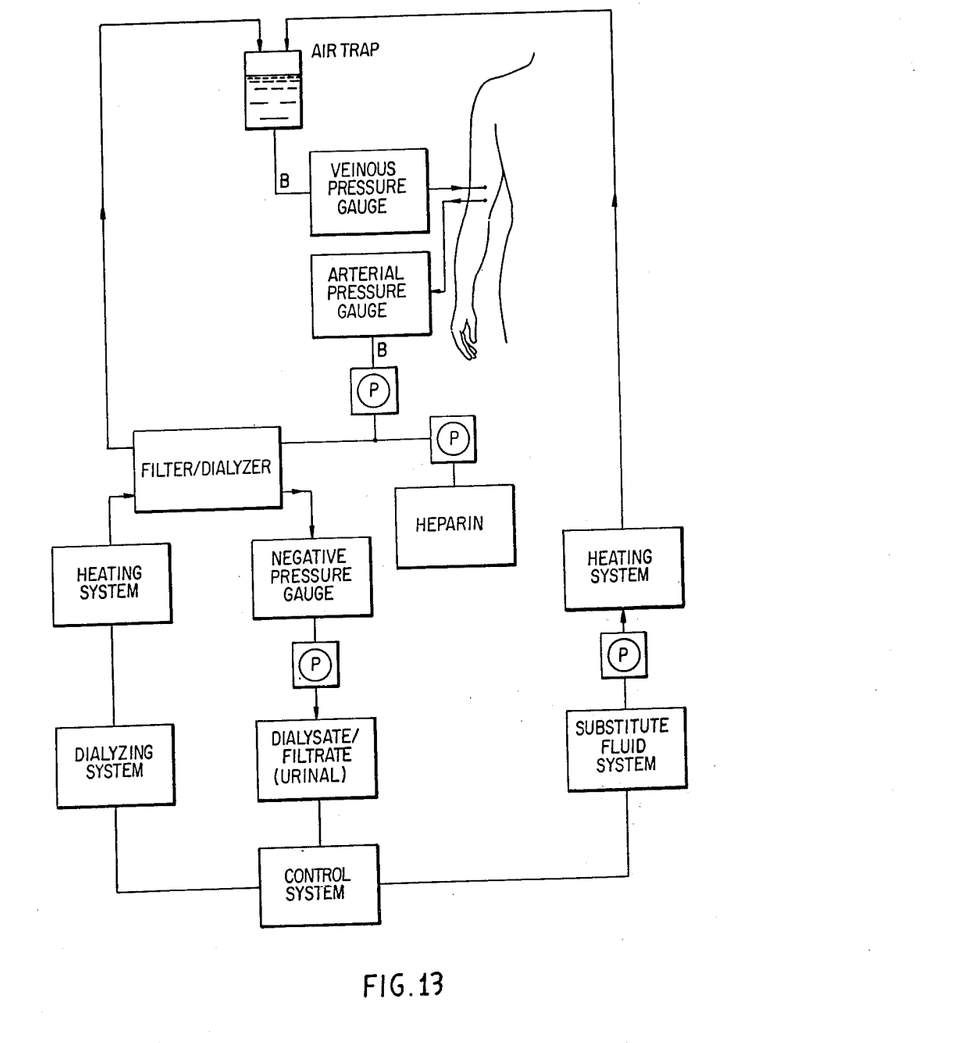
FIG. 13 is a diagrammatic view of the apparatus of the invention, also showing the components necessary for practicing the invention.

The apparatus of the invention is useable in combination with usual equipment for performing the various operations described herein, i.e., the filter is operatively connected with suitable pump means P, heater means H (when necessary or desired), automatic control apparatus C for supervising the dialysator output, and suitable connections for attachment to a patient and to the various parts of the apparatus. This is shown on FIG. 13.

What is claimed is:

1. Apparatus for mass transfer between fluids, wherein a selectively permeable diaphragm unit is interposed between the fluids, the diaphragm unit being supported by a porous diaphragm support which is provided with flow channels for the masses to be transferred;

the diaphragm unit and the diaphragm support being positioned upon each other and pleated to a pleat package with parallel pleats;

the pleat package being enclosed in a box-like casing having walls;

the pleat grooves of one side being sealed off against the pleat grooves of the other side, and against the enclosing casing walls; and the pleat grooves being connected with fluid flow inlets and outlets in the casing for receiving and discharging the fluids;

wherein the improvement comprises:
two diaphragm membranes with the diaphragm support sandwiched therebetween and jointly pleated to a pleat package such that
the pleats form three parallel and separate flow paths for the fluids with a multiplicity of the pleat grooves opening toward one casing wall forming a first flow chamber and a multiplicity of pleat grooves opening toward another casing wall forming a second flow chamber, and the diaphragm support enclosed between the two diaphragm membranes forming a third, hose-like flow chamber which is provided on at least one side of the pleat package with a fluid connection; and wherein the diaphragm surfaces of the pleated diaphragm membranes are disposed facing each other to define narrow gaps and are sealed off at the front sides of the pleat package from the third flow chamber, and in the area of the front sides of the pleat package, the two diaphragm membranes are connected with assigned fluid connections.

2. Apparatus as claimed in claim 1, characterized in that a pressure plate is engaged between at least one of the top and bottom diaphragm surfaces and the casing, in the area between the fluid connections, which determines the spacing between the pleats of the pleat package, and thus the fluid flow density in the area between the fluid connections.

3. Apparatus as claimed in claim 1, characterized in that the casing consists of two equal half shells symmetrically arranged with respect to each other and connected with each other.

4. Apparatus as claimed in claim 3, characterized in that each half shell has two distribution channels which are arranged transversely with respect to the pleat edges to distribute fluid into the first and second flow chambers, and there is a fluid connection in the area of one front wall of one of the half shells, in fluid communication with the third flow chamber.

5. Apparatus as claimed in claim 4, characterized in that the distribution channels face each other transversely to the longitudinal pleat edges and are connected by a distributon bridge which short circuits them with respect to the flow.

6. Apparatus as claimed in claim 5, characterized in that the distribution bridge is constructed as a slide-on structural element on the outside of the casing.

7. Apparatus as claimed in claim 5, characterized in that the first and second flow chambers are connected in parallel through two distribution bridges.

8. Apparatus as claimed in claim 5, characterized in that the first and second flow chambers are connected in series through a distribution bridge.

9. Apparatus as claimed in claim 1, characterized in that a fluid connection for the third flow chamber is provided with a closure.

10. Apparatus as claimed in claim 1, characterized in that the two diaphragm membranes are of the same kind of material.

11. Apparatus as claimed in claim 1, characterized in that one of the diaphragm membranes is constructed as a dialyzer diaphragm and the other diaphragm membrane is constructed as an ultrafiltration diaphragm.

12. Apparatus as claimed in claim 1, characterized in that the first and second flow chambers formed by the pleat grooves are connected with conduits for the conveyance of blood, and the third flow chamber formed by the enclosed diaphragm support is connected with a conduit for the conveyance of one of dialysate, filtrate and oxygen.

13. Apparatus as claimed in claim 1, characterized in that each of the three flow chambers is connected with a different source of fluid whereby three different fluids can be simultaneously conveyed.

14. Apparatus as claimed in claim 1, characterized in that the fluids in the respective flow chambers are connected for conveyance in the same direction.

15. Apparatus as claimed in claim 1, characterized in that the fluids in the first and second flow chambers are conveyed in a direction counter-current to the fluid in the third flow chamber.

16. Apparatus as claimed in claim 1, characterized in that the diaphragm support is formed of unifilar threads.

17. Apparatus as claimed in claim 16, characterized in that the diaphragm support is formed of woven unifilar threads.

18. Apparatus for mass transfer between fluids comprising: a casing having a top wall, a bottom wall, a front wall, a back wall and opposite side walls; a pleat package enclosed within the casing, and including two permeable diaphragm membranes with a porous membrane support sandwiched therebetween and all pleated together with an accordian pleat; sealing material sealing terminal portions of the pleat package to the casing walls to define three separate flow chambers from one end of the casing to the other, including a flow chamber on each side of the pleat package and a flow chamber between the diaphragm membranes of the pleat package; and flow connections connected to the casing for conducting fluid into and away from the casing to obtain a desired treatment of one or more fluids flowing through the apparatus.

19. Apparatus as claimed in claim 18, characterized in that a pump means, heater means, and patient attaching means are connected with the casing fluid connections, and control means is connected with the pump means and heater means to control operation of the same.

20. A filter element for mass transfer between fluids, comprising: two permeable diaphragm membranes with a porous diaphragm support sandwiched therebetween, and pleated together to define a pleat package with the diaphragm membranes and diaphragm support arranged in multiple layers to define a plurality of generally parallel narrow flow passages through which fluids to be treated may be passed, the two diaphragm membranes and porous diaphragm support enabling the filter element to be sealed in a casing in a manner to define three separate flow chambers for the same or different fluids to be treated.

* * * * *

Disclaimer 4,219,422.—*Erich Knothe, Bovenden and Gerhard Lorenz, Krebeck,* Germany. APPARATUS FOR MASS TRANSFER BETWEEN FLUIDS, PROVIDED WITH AN INTERPOSED SELECTIVELY PERMEABLE DIAPHRAGM UNIT. Patent dated Aug. 26, 1980. Disclaimer filed July 6, 1981, by the assignee, *Sartorious GmbH.*

Hereby enters this disclaimer to claim 11 of said patent.

[*Official Gazette Sept. 15, 1981.*]